United States Patent [19]
Sasaki et al.

[11] Patent Number: 5,206,664
[45] Date of Patent: Apr. 27, 1993

[54] RECORDING APPARATUS USING SEMICONDUCTOR LASER

[75] Inventors: Akira Sasaki; Takeshi Kato, both of Hitachi, Japan

[73] Assignee: Hitachi, Ltd., Tokyo, Japan

[21] Appl. No.: 659,679

[22] Filed: Feb. 25, 1991

[30] Foreign Application Priority Data

Feb. 26, 1990 [JP] Japan .................................. 2-42460

[51] Int. Cl.$^5$ ............................................ H04N 1/21
[52] U.S. Cl. ...................................... 346/108; 358/296
[58] Field of Search .................... 346/108, 107 R, 160, 346/1.1; 358/296, 300, 302, 298

[56] References Cited
U.S. PATENT DOCUMENTS 4,574,176 3/1986 Sharp ............................ 219/121 LD Primary Examiner—Mark J. Reinhart
Attorney, Agent, or Firm—Antonelli, Terry, Stout & Kraus

[57] ABSTRACT

A recording apparatus using a semiconductor laser comprises a video signal processor which reduces the time for conduction of current in a semiconductor laser diode by cutting away a pulse signal for turn on/off of the semiconductor laser diode at its leading and trailing edges. For both a one pulse signal representative of an isolated one dot and a one pulse signal representative of continuous plural dots, the signals being transmitted from a host, the processor contracts the pulse width of the pulse signal at its leading and trailing edges to permit uniform recording which is not influenced by the manner of arranging dots.

8 Claims, 7 Drawing Sheets

RECORDING APPARATUS USING SEMICONDUCTOR LASER

BACKGROUND OF THE INVENTION

1. Field of the Invention

The present invention relates to a semiconductor laser recording apparatus and more particularly to video data signal processing suitable for recording images of high resolution and high quality.

2. Description of the Related Art

As described in JP-A-61-234168, this type of recording apparatus uses a pulsed laser turn-on signal transmitted from an information processor to the recording apparatus and when dots which are continuous in the main scanning direction are to be recorded, the pulse signal assumes a 100% duty continuing over the continuous dots. Accordingly, a beam spot shape formed on the recording medium by a laser beam is longitudinally or in a direction perpendicular to the scanning direction elongated and when the spot size in the scanning direction is not less than about ½ of the dot pitch, the contrast potential, i.e. a difference between the potential of electrostatic charge representing a latent image on a photosensitive element and the bias potential used in development of the latent image, in development of an image produced by one dot irradiation is lower than that of an image produced by two or more dots irradiation. Therefore, in a known recording apparatus, when one isolated dot is recorded, current applied to the laser diode is increased, thereby intensifying the laser beam for increasing the contrast potential and improving the picture quality.

However, the method of instantaneously increasing the current applied to the laser diode involves the following problems:

(1) Two constant current switching circuits for high-speed operation are required to be used for the laser beams of different intensities.

(2) The time required for adjusting deviation in slope efficiency is doubled.

(3) In the semiconductor laser, the optical output is highly sensitive to the drive current and a slight change in the current leads to a large change in the optical output. Therefore, the laser beam output is liable to fluctuate in response to deviation in temperature and adjusted value between the two switching circuits.

FIGS. 6A to 6E show how a video data signal or video data 1 is related to the laser beam energy distribution and the recording dot shape. The video data 1 in FIG. 6A indicates one signal for isolated one-dot recording and another signal for continuous three-dot recording.

Figure 6A:
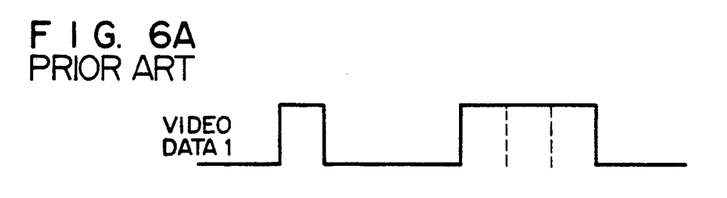
FIGS. 6A to 6E are diagrams showing the operation of a prior art recording apparatus.
Figure 6B:
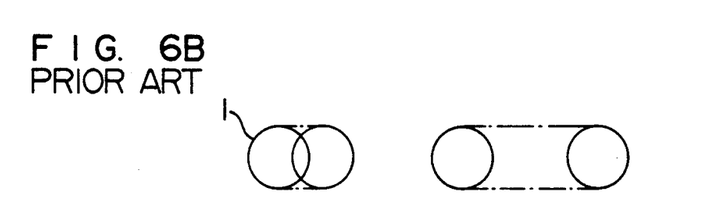
Figure 6C:
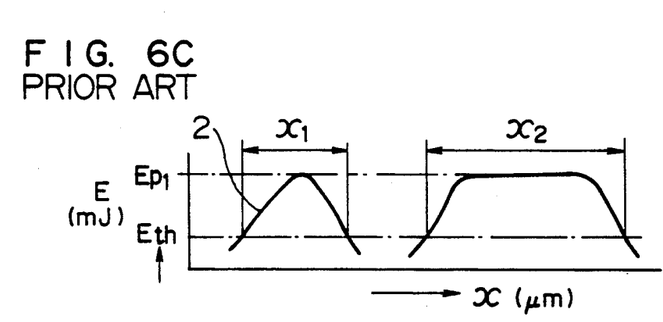
Figure 6D:
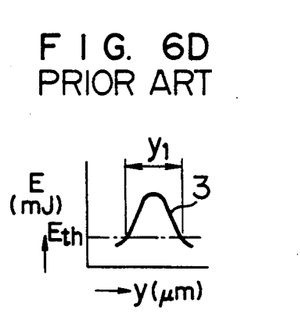
Figure 6E:
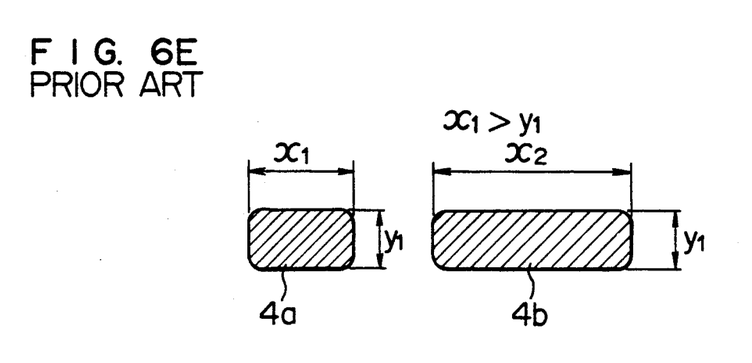
Figure 7A:
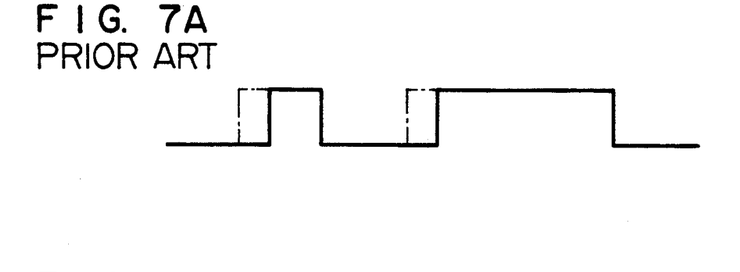
FIGS. 7A to 7E are diagrams showing the operation of another prior art recording apparatus.
Figure 7B:
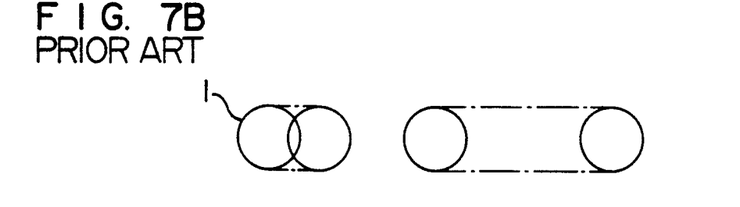
Figure 7C:
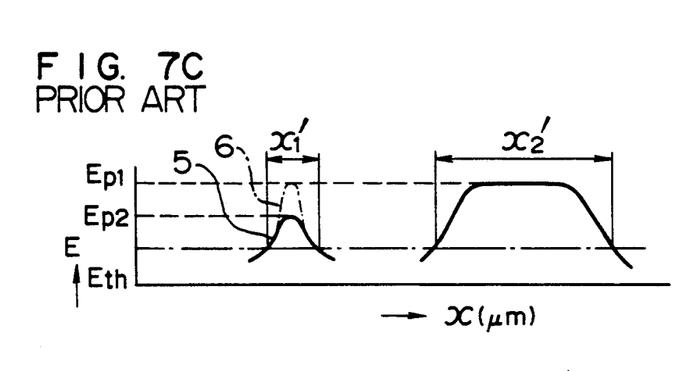
Figure 7D:
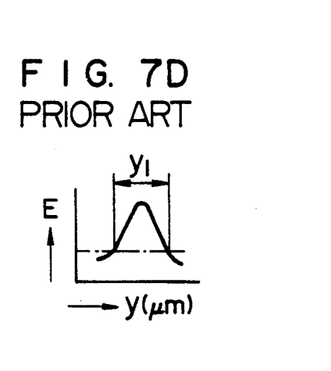
Figure 7E:
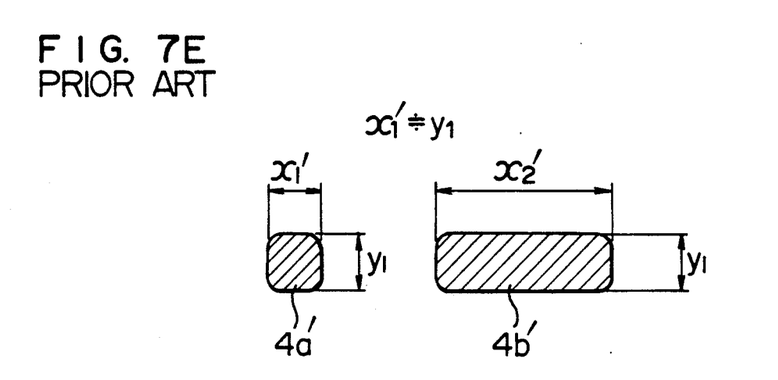

When the video data 1 assumes a high level in the isolated one-dot recording signal, the semiconductor laser diode is turned on and a spot 1 is formed by a laser beam on a photoelectric recording medium for electrophotographic recording. The laser beam is deflected by a deflection mirror to move the laser spot 1 in a direction of deflection as shown in FIG. 6B. An optical energy distribution characteristic applied by the laser spot 1 to the photoelectric recording medium has a component as shown by curve 2 in FIG. 6C in a moving direction x of the laser spot 1 and a component as shown by curve 3 in FIG. 6D in a direction y orthogonal to the moving direction. The photoelectric recording medium sensitized in accordance with the distribution characteristic is developed to obtain a recording dot which has an isolated one-dot shape indicated at reference character 4a in FIG. 6E when the threshold level is at Eth. Similarly, the continuous three-dot recording signal presents a continuous three-dot shape indicated at reference character 4b in FIG. 6E.

But the recording dot shape, especially the isolated one-dot shape 4a is unbalanced in the ratio between longitudinal dimension x1 and lateral dimension y1 to provide a longitudinally elongated dot shape which makes a bad appearance. In order to correct this disadvantage, as shown in FIGS. 7A to 7E, the video data is cut away at its leading edge to provide a recording dot 4a' having a longitudinal dimension x1' and a lateral dimension y1 nearly equal to x1'. With the video data cut away at its leading edge, the optical energy acting on the photoelectric recording medium is decreased as shown at curve 5 and hence, in order to obtain an elevated curve 6, the drive current for the semiconductor laser diode must be increased for recording the isolated one dot.

SUMMARY OF THE INVENTION

The above correction method is effective to correct the isolated one-dot shape 4a but is rather ineffective to correct a longitudinal dimension x2 of the continuous plural-dot shape 4b; in addition, it involves a problem that the center position of the recording dot is displaced and recording of images of high resolution is difficult to achieve.

The present invention is aimed at elimination of the above disadvantages and has an object to ensure recording of high-resolution pictures.

The present invention features the provision of a video signal processor which reduces the time for conduction of current in a semiconductor laser oscillator by cutting away a video data signal, which is used for turning on/off the semiconductor laser oscillator, at its leading and trailing edges.

For both a signal representative an isolated one dot and a signal representative of continuous plural dots, the video signal processor contracts the pulse width of the signal at its leading and trailing edges to permit uniform recording which is not influenced by the manner of arranging dots.

DESCRIPTION OF THE PREFERRED EMBODIMENTS

Figure 2:
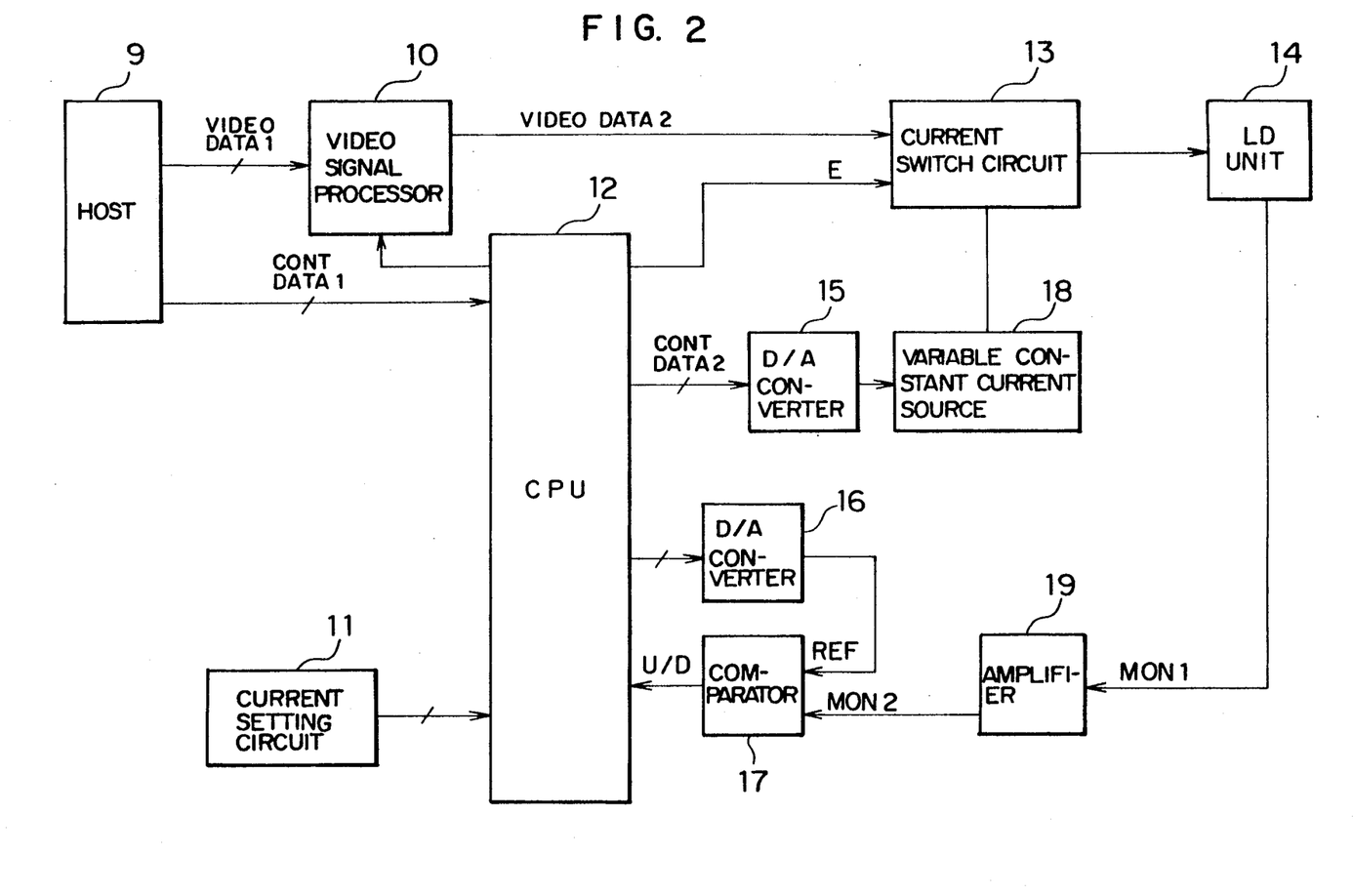
FIG. 2 is a block diagram of the semiconductor laser recording apparatus of the invention.

A preferred embodiment of the invention will now be described with reference to FIG. 2.

Video data 1 to be used for a laser recording apparatus is sent from an information processor (hereinafter referred to as a host) 9 to a video signal processor 10 according to the present invention. The video data 1 is processed by the processor 10 to provide video data 2 which is applied to a current switch circuit 13 adapted to drive a semiconductor laser unit (hereinafter called an LD unit) 14. The current switch circuit 13 is so constructed as to take an operative state or an inoperative state depending on the level of an output signal E from a CPU 12. In the inoperative state, the switch circuit 13 does not respond to the video data 2. The CPU 12 determines the level of the output signal E on the basis of control data 1 transmitted from the host 9 to the CPU 12.

The magnitude of a current in the LD unit 14 is controlled by a digital/analog converter (hereinafter called a DAC) 15 and a variable constant current source 18. The variable constant-current source 18 supplies to the current switch circuit 13 a constant current having a magnitude which is determined by an analog control signal supplied from the DAC 15, and the DAC 15 converts a digital control signal representative of control data 2 supplied from the CPU 12 into the aforementioned analog control signal.

Setting a control target reference value and changing the set control target reference value are carried out by inputting reference value control data from a current setting circuit 11 to the CPU 12 through a keyboard, for example, by an operator. The CPU 12 applies digital reference data corresponding to the control target reference value to a DAC 16 which in turn delivers analog reference value data REF. On the other hand, a laser diode and a monitor diode are provided in the LD unit 14 and the monitor diode delivers an output signal MON 1 indicative of the intensity of a laser beam emitted from the laser diode. The output signal MON 1 is amplified by an amplifier 19 and applied as an amplified signal MON 2 to a comparator 17. The comparator 17 compares the signal MON 2 with the aforementioned reference value data REF to produce a comparison output signal U/D which is applied as a feedback signal to the CPU 12. The CPU 12 changes the magnitude of the control signal or control data 2 in accordance with the feedback signal U/D.

With the above construction, when the current setting circuit 11 is operated to set a control target reference value which is, for example, for increasing current, the CPU 12 supplies to the DAC 16 data by which the value of the reference value data REF is increased. When the voltage level of the reference value data REF is larger than the signal MON 2, the comparator 17 produces the comparison output signal U/D which is a high "H" level and the CPU 12 delivers an increased value of control data 2 to the DAC 15 in order to increase the current value of the variable constant-current source 18. This operation continues until the comparison signal U/D takes a low "L" level.

The construction and operation of the video signal processor 10 will now be described with reference to FIGS. 1A to 1E, 3, 4A and 4B, and 5.

Figure 3:
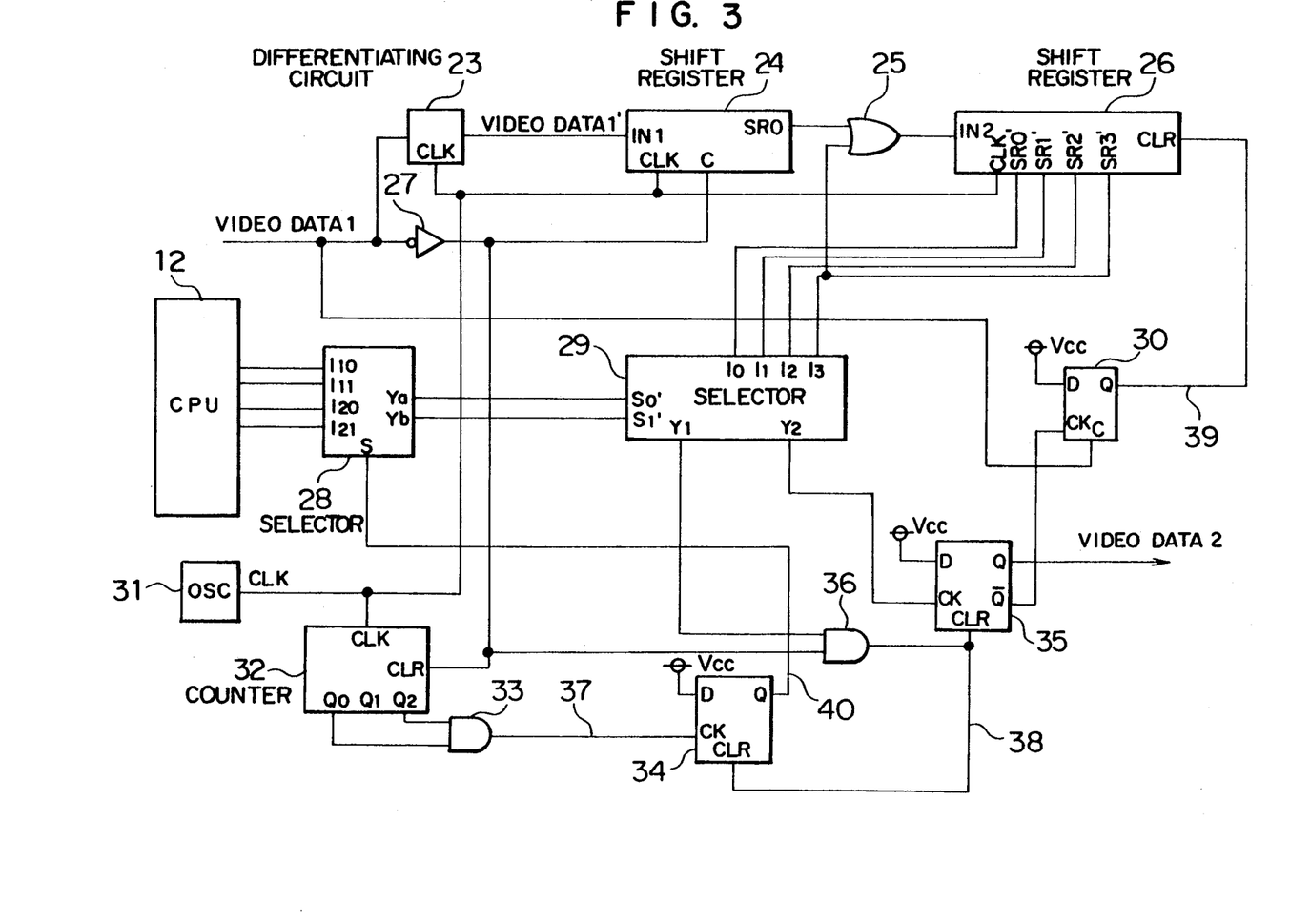
FIG. 3 is a block diagram of a video signal processor.

FIG. 3 shows details of the video signal processor 10. The video data 1 supplied from the host 9 to be used for the recording apparatus is received by a differentiating circuit 23. The differentiating circuit 23 also receives at its clock terminal a clock signal CLK delivered out of an oscillation circuit 31 and the two signals cooperate with each other to prepare a differential signal or video data 1'.

Figure 4A:
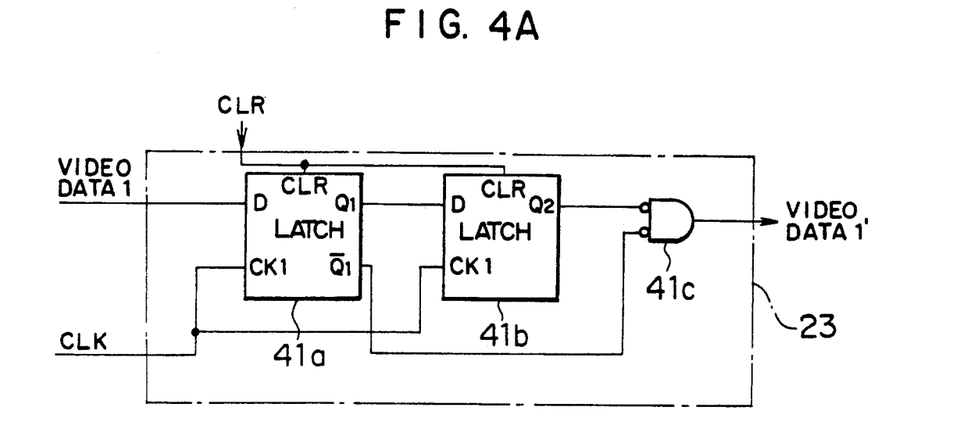
FIG. 4A is a block diagram of a differentiating circuit.
Figure 4B:
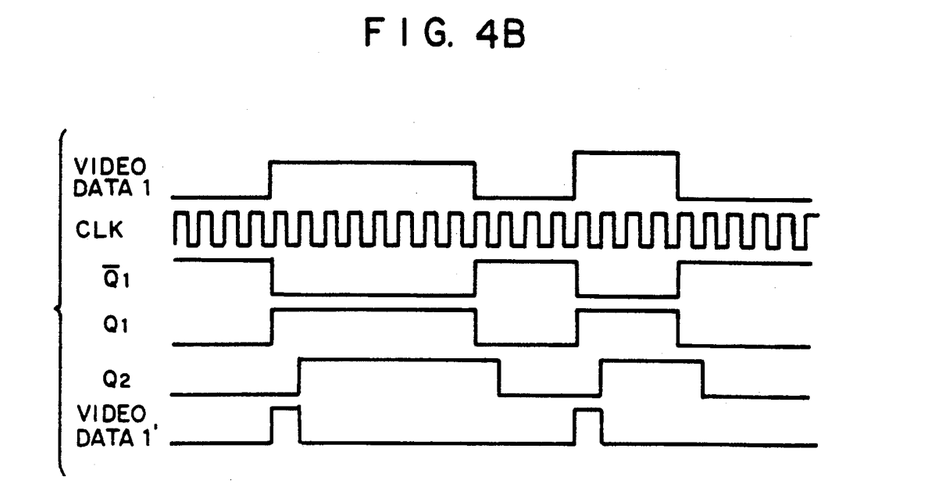
FIG. 4B is a timing chart for the differentiating circuit.

Referring to FIGS. 4A and 4B, a typical example of the differentiating circuit 23 will be described. The differentiating circuit 23 latches the leading or rising edge of a high level pulse in the incoming video data 1 at a timing of a clock signal CLK of a frequency higher than that of the video data 1 and produces a differential signal or video data 1' of high level "H" continuing a time interval corresponding to one cycle period of the clock signal CLK. FIG. 4B shows timings of the video data 1, the clock signal CLK, output signals $\overline{Q1}$, Q1 and Q2 of latches 41a and 41b and the output video data 1' of a NAND element 41c. In this example, the leading edge of the high level pulse in the video data 1 is latched, because the laser is to be turned on at the "H" level of the video data 1. The output video data 1' is a differential signal of the video data 1.

Returning to FIG. 3, it is noted that in the present embodiment four cycles of the clock signal produced by the oscillation circuit 31 correspond to the duration time of one isolated dot in the video data 1.

The differential signal video data 1' is inputted to a serial data input terminal IN1 of a shift register 24 and shifted in synchronism with the clock signal CLK of the oscillation circuit 31. Thus, the shift register 24 produces an output signal SR0 which is shifted by three clocks from the video data 1'. The output signal SR0 is inputted, together with an output signal SR3' of a shift register 26, to an OR element 25 and an output signal of the OR element 25 is inputted to a serial data input terminal IN2 of the shift register 26. The shift register 26 shifts the signal SR0 inputted to the terminal IN2 with each pulse of the clock signal CLK so that the shifted signal is produced from the terminals SR0', SR1', SR2' and SR3' successively and the output from the terminal SR3' is fed-back through the OR element 25 to the input terminal IN2.

The output signals SR0' to SR3' of the shift register 26 are applied to a selector 29 which determines timings for clock and clear of flip-flops 34 and 35. Select signals for determining which of the output signals SR0' to SR3' of the shift register 26 are to be applied to terminals Y1 and Y2 are selectively determined by a selector 28 under control of the CPU 12. Truth tables for the selectors 28 and 29 are shown at (a) and (b) in Table 1.

TABLE 1

| (a) | | | (b) | | | |
|---|---|---|---|---|---|---|
| S | Ya | Yb | S0' | S1' | Y$_1$ | Y$_2$ |
| 0 | I$_{10}$ | I$_{11}$ | 0 | 0 | I$_3$ | I$_1$ |
| 1 | I$_{20}$ | I$_{21}$ | 0 | 1 | I$_2$ | I$_2$ |
| | | | 1 | 0 | I$_1$ | I$_3$ |
| | | | 1 | 1 | — | — |

Specifically, signals from the terminals Y2 and Y1 are used to determine the leading and trailing edges of the video data 1 so that the video data 1 may be processed so as to be varied in duty and then delivered.

The selector 28 operates to change the timings for clock and clear of the flip-flops 34 and 35 depending on whether the video data 1 assumes one dot isolation or plural-dot continuation. More specifically, when a select input signal S is "1" or "0", the selector 28 delivers from its output terminals Ya and Yb input signals I$_{10}$ and I$_{11}$ which provide the timings for clock and clear of the flip-flops 34 and 35 adapted for the video data 1 assuming one dot isolation, and when the select signal is "H" or "1", the selector 28 delivers from its output terminals Ya and Yb input signals $I_{20}$ and $I_{21}$ which provide the timings for clock and clear of the flip-flops adapted for the video data 1 assuming plural-dot-continuation. In this manner, depending on whether the video data 1 assumes one dot isolation or plural-dot continuation, the timings for output signals Y1 and Y2 are varied, thereby ensuring that the duty of the video data 2 can be set in the case where the video data 1 assumes one dot isolation independently of the case where the video data 1 assumes plural-dot continuation.

Whether the video data 1 assumes one dot isolation or plural-dot continuation is detected by a counter 32 and the flip-flop 34. The video data 1 is inverted by a NOT element 27 and applied to a clear terminal of the counter 32. Outputs Q0 and Q2 of the counter 32 are connected to an AND element 33 and the output of the AND element 33 is connected to a clock input CK of the flip-flop 34. Thus, the counter 32 counts up while the video data 1 keeps "H", so that when the video data 1 assumes plural-dot continuation, the counter counts the clock signal CLK from the oscillation circuit 31 by 5 or more clocks to cause the AND element 33 to produce on its output 37 a clock signal by which the output Q of the flip-flop 34 is rendered to be "H". When the video data 1 assumes one dot isolation, the video data 1 is rendered to be "1" at the termination of 4-clock count-up by the counter 32 thereby to clear the counter, so that the output Q of the flip-flop 34 remains "L". The output Q of the flip-flop 34 is connected to the select input S of the selector 28 so that the selector 28 selects the timings for clock and clear delivered out of the CPU 12 according to the level of the input S as mentioned before.

An AND element 36 is applied with the output signal Y1 of the selector 29 and the inverted signal of video data 1 in order that only when the video data 1 is "L", the output signal Y1 of the selector 29 is allowed to be applied to clear terminals of the flip-flops 34 and 35.

A flip-flop 30 is adapted to determine the timing for clear of the shift register 26, and it renders its output Q "H" at the trailing or falling edge of video data 2 and is cleared in response to "H" of the video data 1.

Figure 5:
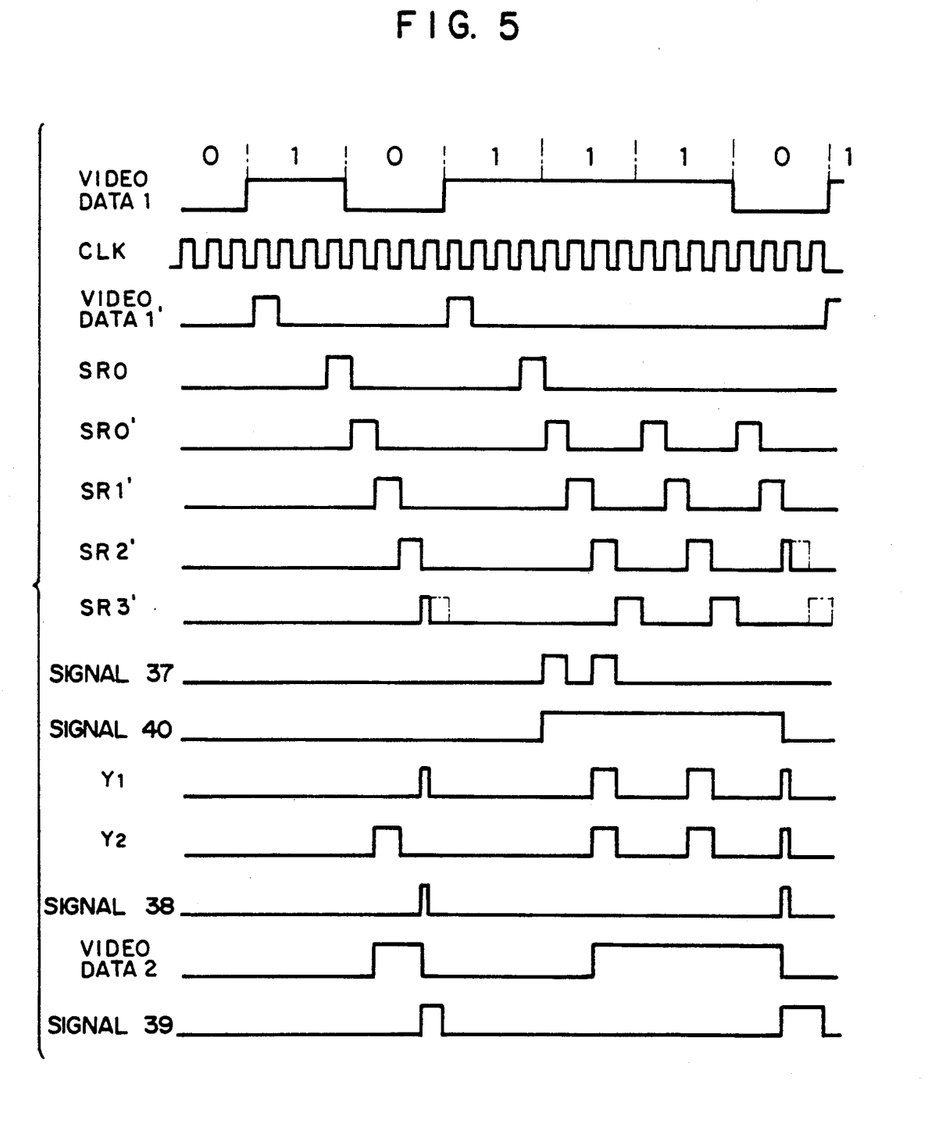
FIG. 5 is a timing chart for explaining the operation of the semiconductor laser recording apparatus.

The operation of each component as described previously will be described in greater detail with reference to a timing chart of FIG. 5.

A description will be given based on an example where video data 1 including a recording signal of an isolated one dot and a recording signal of continuous three dots is supplied from the host 9. That is, the video data 1 is represented by "0101110".

The video data 1 is inputted to the differentiating circuit 23 and a differential signal or video data 1' is produced therefrom. The video data 1' is shifted by the shift register 24 to provide a signal SR0. The signal SR0 is shifted by the shift register 26 to provide signals SR0' to SR3'. The signals SR0' to SR3' are applied to the inputs I0 to I3 of the selector 29. The inputs I0 to I3 of the selector 29 are selectively connected to the outputs Y1 and Y2 in accordance with the select signals ($I_{10}$, $I_{11}$) or ($I_{20}$, $I_{21}$) supplied from the CPU 12, which are selected by the select signal S applied to the selector 28. In this example, ($I_{10}$, $I_{11}$) = (0, 0) and ($I_{20}$, $I_{21}$) = (0, 1).

Only when the video data 1 is "H", the counter 32 counts up so that when a plural-dot signal of video data 1 is supplied from the host, the AND element 33 produces a clock signal at its output 37 and it is cleared when the video data 1 is rendered "L". When the clock signal 37 is applied to the flip-flop 34, this flip-flop produces a signal 40 which is supplied to the selector 28. In particular, for the signal 40 being "L", the selector 28 produces output signals (Ya, Yb) = (0, 0) and for the signal 40 being "H", output signals (Ya, Yb) = (0, 1). In consequence, when the video data 1 assumes one dot isolation (rendering the signal 40 "L"), Y1 = SR3' and Y2 = SR1' are provided so that the video data 1 is processed so as to be cut away by ¼ dot at its leading and trailing edges to provide video data 2 and when the video data 1 assumes plural-dot continuation (rendering the signal 40 "H"). Y1 = Y2 = SR2' is provided so that the video data 1 is processed so as to be cut away by ½ dot at its leading and trailing edges to provide video data 2.

FIGS. 1A to 1E illustrate beam distribution curves and developed dot shapes obtained with the video signal processor 10 and correspond to those of the prior art as shown in FIGS. 7A to 7E, respectively.

Figure 1A:
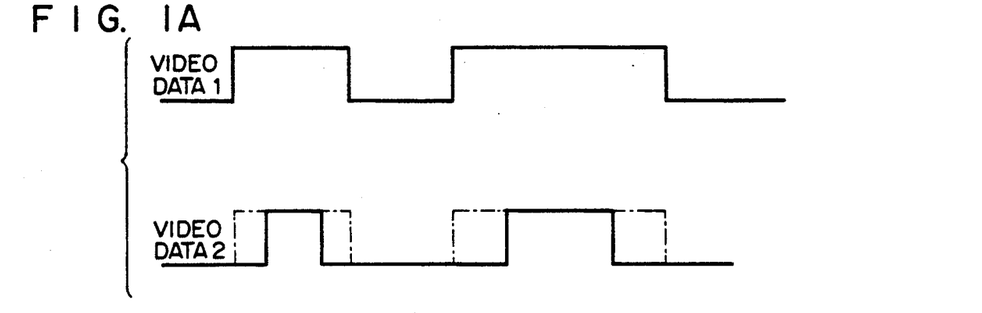
FIGS. 1A to 1E are diagrams showing the operation of a semiconductor laser recording apparatus according to the invention.
Figure 1B:
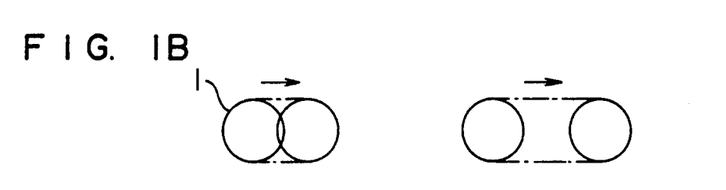
Figure 1C:
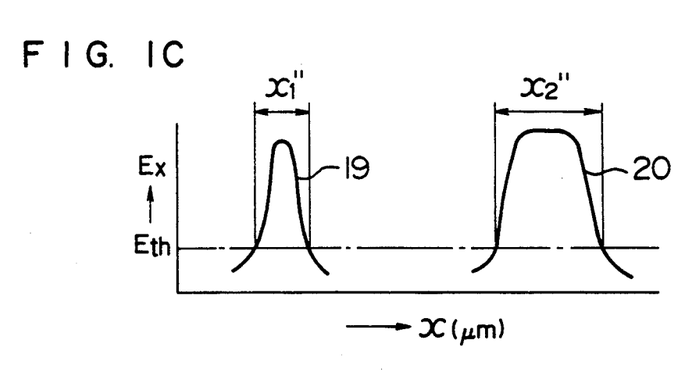
Figure 1D:
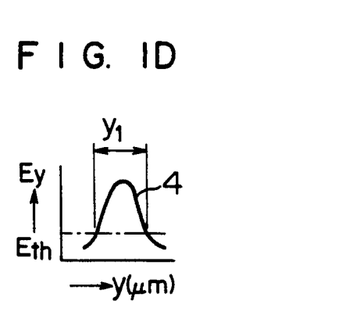
Figure 1E:
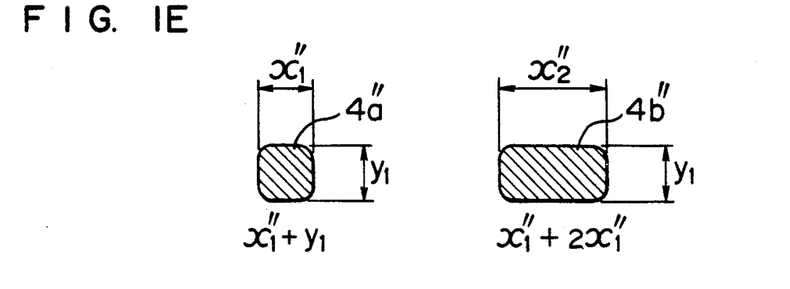

The video data 1 sent from the host 9 is contracted at its leading and trailing edges by means of the signal processor 10 to provide the video data 2 shown in FIG. 1A.

In accordance with the present embodiment, as compared to the duty of the incoming video data, the duty of the video data for one dot isolation printing is made to be 50% and the duty of the video data for two-dot continuation printing is also made to be about 50%. In addition, laser power for one dot isolation printing is set such that the light beam distribution curve 6 shown in FIG. 7C can be obtained (the light beam distribution curve 6 is equivalent to a light beam distribution curve 19 in FIG. 1C) and in order to eliminate a serious problem such that the longitudinal dimension x2″ of the recording dot 4b″ at two-dot continuation printing would be increased, the duty of the video data for two-dot continuation printing is reduced to approximate 50% correspondingly to the 50% duty for one dot isolation printing.

More particularly, in the conventional video data signal processing using a delay circuit, the video data 1 is contracted at its leading edge alone, so that when the duty of the video data for one dot isolation printing is made 50%, the duty of the video data for two-dot continuation printing is automatically set to 75% in excess of 50%, leading to the disadvantage that unbalance between lateral and longitudinal lines of two-dot continuation is increased.

However, in accordance with the present embodiment, the duty for at least one dot isolation printing and the duty for two-dot continuation printing can be set independently of each other and the on-level of the video data 1 is contracted at the leading and trailing edges, thus attaining advantages that the positional accuracy of dot can be improved greatly and the change of dot density (for example, from 240DPI to 300DPI) can be realized by selection of duty without changing the optics.

According to the present invention, the laser turn on/off signal is reduced in duty by cutting away the signal at its leading and trailing edges (rising and falling edges) to attain the following advantages:

(1) Stable recording dot sizes can be obtained for both isolated one dot printing and plural-dot continuous printing and besides the dot position accuracy can be improved;

(2) The vertical to horizontal ratio of dot size can be improved for both the isolation dot and continuous plural-dot; and (3) The change of dot density can be attained by using conventional optics.

We claim:

1. A semiconductor laser recording apparatus for recording an image by scanning a laser beam from a semiconductor laser oscillator on a recording medium, said apparatus comprising a video signal processor including means for reducing a current conduction time for said semiconductor laser oscillator by cutting away a pulse signal for control of turn on/off of said semiconductor laser oscillator at its leading and trailing edges, and means for causing said semiconductor laser oscillator to conduct current based on the pulse signal cut away by the reducing means.

2. A semiconductor laser recording apparatus according to claim 1, wherein the reducing means includes means for independently setting a current conduction time reduction amount for isolated one-dot recording and a current conduction time reduction amount for continuous plural-dot recording.

3. A semiconductor laser recording apparatus according to claim 1, wherein the reducing means includes means for controllably setting a current conduction time reduction amount for said semiconductor laser oscillator.

4. A semiconductor laser recording apparatus for recording an image by scanning a laser beam from a semiconductor laser oscillator which is on/off controlled on the basis of video data applied thereto, said apparatus comprising a video signal processor which includes:

means for determining whether the video data is for recording of an isolated one dot or for recording of continuous plural dots; and a processing circuit which reduces a time for conduction of current in said semiconductor laser oscillator by cutting away a pulse signal for on/off control of said semiconductor laser oscillator at its leading and trailing edges by an amount variable depending on whether the video data is for recording of the isolated dot or continuous plural dots.

5. A semiconductor laser recording apparatus having a host operable to generate a video data signal corresponding to dots representative of an image to be recorded and a recording unit operable to turn on/off a semiconductor laser oscillator on the basis of said video data signal to record dots on a recording medium, said host comprising a video signal processor which reduces a time for turn on/off of said semiconductor laser oscillator by cutting away said video data signal at its leading and trailing edges.

6. A semiconductor laser recording apparatus for recording an image by scanning a laser beam on a recording medium, comprising:

a semiconductor laser oscillator for generating a laser beam for use in recording an image; and a video signal processor including
means for receiving a first video signal including first pulses representing an image to be recorded,
means for reducing respective pulse widths of the first pulses by cutting away respective leading and trailing edges of the first pulses, thereby producing a second video signal including second pulses corresponding to the first pulses but having reduced pulse widths relative to the first pulses, and
means for controlling the semiconductor laser oscillator based on the second video signal such that the semiconductor laser oscillator is turned on and off by the second pulses in the second video signal.

7. A semiconductor laser recording apparatus according to claim 6, wherein the first pulses in the first video signal include isolated one-dot recording pulses and continuous plural-dot recording pulses, and wherein the reducing means includes means for reducing respective pulse widths of the isolated on-dot recording pulses by a first amount, and means for reducing respective pulse widths of the continuous plural-dot recording pulses by a second amount different from the first amount.

8. A semiconductor laser recording apparatus according to claim 6, wherein the reducing means includes means for controllably setting an amount by which the respective pulse widths of the first pulses are reduced.

* * * * *